United States Patent [19]

Itoh et al.

[11] 4,339,292

[45] Jul. 13, 1982

[54] METHOD FOR PRODUCING A REINFORCED, DOUBLE-FACED CORRUGATED BOARD

[75] Inventors: Shuji Itoh, Takaoka; Yoji Yoshida, Nagoya, both of Japan

[73] Assignee: Kyokuto Fatty-Acid Corporation, Tokyo, Japan

[21] Appl. No.: 233,281

[22] Filed: Feb. 10, 1981

Related U.S. Application Data

[62] Division of Ser. No. 52,581, Jun. 27, 1979, Pat. No. 4,274,905, which is a division of Ser. No. 853,568, Nov. 21, 1977, abandoned.

[51] Int. Cl.³ .......................... B32B 3/28; B31F 1/20
[52] U.S. Cl. .................................. 156/206; 156/210; 156/322; 428/184; 428/186; 428/191; 428/212
[58] Field of Search ............... 428/184, 186, 191, 189, 428/212; 156/210, 205, 206, 207, 470, 322; 220/418

[56] References Cited

U.S. PATENT DOCUMENTS 2,885,138  5/1959  Brackett et al. .................. 220/418

*Primary Examiner*—Paul J. Thibodeau
*Attorney, Agent, or Firm*—Wenderoth, Lind & Ponack

[57] ABSTRACT

The present invention relates to a reinforced corrugated board which is specifically reinforced in only those locations where such reinforcing is required in the product produced from this board. The board has a smooth top face or liner and a first corrugated layer adhesively affixed therebeneath. To the bottom of the first corrugated layer, a second corrugated layer is affixed. This second layer is only as large as the area requiring special reinforcing in the final product and need not be as large as the first corrugated layer. A bottom liner or facing is affixed to the second corrugated layer and any of the first corrugated layer which extends around the second layer.

An apparatus and method for producing this board sheet are also presented.

2 Claims, 3 Drawing Figures

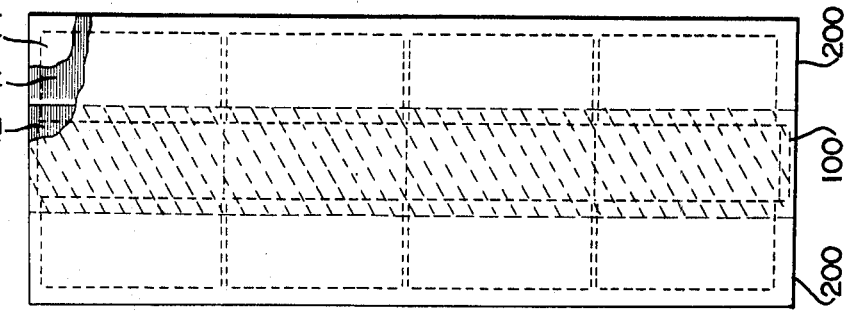
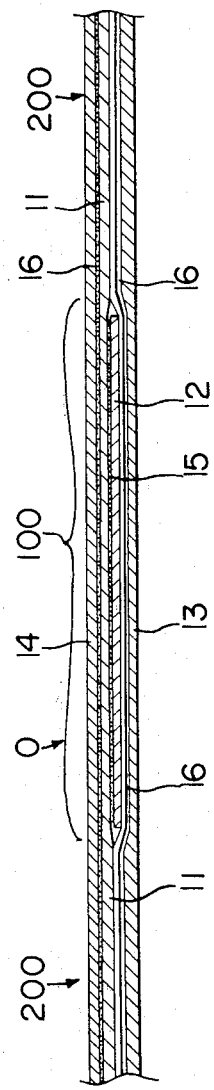

METHOD FOR PRODUCING A REINFORCED, DOUBLE-FACED CORRUGATED BOARD

This is a division of application Ser. No. 52,581, filed June 27, 1979, now U.S. Pat. No. 4,274,905, which is a division of application Ser. No. 853,568, filed Nov. 21, 1977, now abandoned.

BACKGROUND AND SUMMARY OF THE INVENTION

The present invention relates to a special reinforced, double-faced corrugated board and an apparatus and method for making this board.

Generally, in construction of a corrugated board box, it is necessary that the sidewalls or depth of the box be of greater compressive strength than the top or bottom surfaces or flaps of the box. However, to make a corrugated board sheet of sufficient strength for the sidewalls has also resulted in top and bottom surfaces or flaps having the same strength, since only one board is cut to form each box, and that board is usually entirely reinforced. This is a waste, since there is no need for this reinforcing on the top and bottom.

Therefore, it is an object of the present invention to provide a reinforced, double-faced corrugated board which is only reinforced in locations which require reinforcing and nowhere else.

Another objective is to provide such a reinforced, double-faced corrugated board which has at least one surface thereof which may be easily printed thereon.

Finally, this invention also provides an apparatus and method for quickly, easily, and efficiently providing this corrugated board sheet.

The present invention provides a reinforced, double-faced sheet wherein double reinforcement is provided only in the locations requiring this additional strength. A smooth top liner facing surface is adhesively affixed to a first corrugated layer which is roughly the same dimensions as the facing liner. Adhesively attached to the other side of the first corrugated layer is a second corrugated layer which provides the needed extra reinforcement for the finished product. This second corrugated layer need only be as large as necessary to provide the specific double reinforcement where needed, such as the sidewalls of the box. Finally a bottom layer or facing liner is affixed to the bottom of the second corrugated layer and any of the bottom surface of the first corrugated layer which is not affixed to the second corrugated layer.

The reinforced double-faced board is obtained by adhesively affixing the material for making the first corrugated layer to the material for making the second layer. Then, both materials are passed together through corrugating rolls and from there affixed under pressure to the bottom facing liner. After the bottom liner is affixed, a top liner facing is affixed to the top surface of the first corrugated layer.

BRIEF DESCRIPTION OF THE DRAWINGS

These and other objects of the invention will be apparent from the following description and the formal drawings, wherein:

FIG. 1 shows a longitudinal cross-section of a board sheet of the present invention, FIG. 2 shows a partially cut away top view of the board of the present invention and the layered material therein; and FIG. 3 shows an apparatus for making the board sheet of this invention.

DETAILED DESCRIPTION OF THE INVENTION

The reinforced double-faced corrugated board sheet O of the present invention is shown in FIGS. 1 and 2. Primarily, the sheet O has a front or top liner 14 and a back or bottom liner 13 with corrugated mediums therein between.

These corrugated mediums are arrayed in several layers which are adhesively attached to each other. The first corrugated layer 11 is adhesively bonded by adhesive 16 to one side of the top liner 14 and is substantially the same width as the top layer. A second corrugated layer 12 is adhesively bonded by adhesive 15 to the side of the first corrugated layer 11 on the side opposite the top liner 14. The second corrugated layer 12 may be of a smaller, predetermined width than the first corrugated layer 11, so that it will act to specifically reinforce only a portion of the width of the first corrugated layer. This second corrugated layer 12 is also adhesively attached by a second layer of adhesive 16 on the side opposite the first corrugated layer 11 to the bottom liner 13.

As shown in FIG. 1, the bottom liner 13 is depressed to accommodate the second corrugating layer 12. Because of this structural deformation for the second layer 12, there is no disruption in the surface of either the top liner 14 or the bottom liner 13 which might normally result when a layer of lesser width is positioned between two wider layers. By so positioning the second layer 12, printing or marking on both the top and bottom liners is facilitated.

FIG. 1 further shows that on both sides of the center reinforced section 100, wherein the second corrugated layer 12 is provided, there are side strips 200 which are merely the top and bottom liners 13 and 14 adhesively attached to only the first corrugated layer 11. This area 200, therefore, is only reinforced by a single layer, rather than a double layer, as is the center section 100. However, the thickness of the side portions 200 is the same as the center section, since the bottom liner 13 is not depressed at these side portions to receive the second corrugated layer 12.

At this point, it should be recognized that the specific placement of the second corrugated layer 12 between the first corrugated layer 11 and the bottom liner 13 is a matter of design choice and is not limited strictly to the center of the sheet. In situations where only the sidewalls of a container are required to be specifically reinforced, the second layer 12 may be positioned in the center as shown by the shaded area in FIG. 2. The center section 100 may act as the sidewalls, while the side portions 200 may be used as the top and bottom flaps. This arrangement can be useful and economical, since the reinforcement is located only where needed—at the sides—and not across the top or bottom. If, however, all around reinforcement is necessary, the width of the second corrugated layer may be adjusted to provide for increased reinforcement. Finally, it is also possible, depending on how the box or container is formed, to have more than one section which has the second corrugated layer 12. In that instance, plural second layers may be positioned across the width of the sheet board and be spaced from each other accordingly.

FIG. 2 also shows the configuration of a box container and reveals that it is best if the double reinforced center section 100 be slightly wider by about 2 cm than the height of the finished box from the center of the double reinforced section. This will help to increase the overall crush strength of the container. In this example, the flat crush strength of the reinforced section 100 is nearly 1.7 to 2.0 times greater than the strength of the single layer reinforced side portions 200 or other simply layered materials which are equivalent to the thickness of this double corrugated layer reinforced section 100.

The strength of the container, it must be realized however, depends on the materials comprising the various layers. For example, if a relatively weak container is necessary, thinner layers and liners may be provided. Also, since the second layer 12 is never seen, there is no need to specially finish the material, especially the edges thereof, and cost savings can be further realized.

There is no particular material required to produce this sheet board. It is possible to use varying grades of paper or plastic film, or even a combination of plastic film and paper for any of the corrugated layers and liners.

The adhesive layers 15, 16 to be applied between the layers and liners can be chosen according to the materials to be combined with each other from among those adhesives which are strong after hardening and which adhere easily, for instance: synthetic resins such as polyvinyl acetate, polyvinyl chloride, polyolefine, acrylate resins or styrol resins, and their polymers, copolymers or their compounds; and synthetic rubbers or natural high polymerized compounds such as ester gum, starch and CMC etc., and their solutions, emulsions or compounds. Especially useful, also, are the adhesives which give stiffness and water-proofness to the corrugated boards because of the continuous forming of the adhesive film after hardening, for example, the emulsion of styrol resin (50% of monomeric percentage) in which the plasticizer of 20-30% solid contents or the emulsified plasticizer are added. If, during the process of forming the corrugated layers, the corrugator is not affected by heat, a heat-sensitive adhesive may be used.

To produce simply a reinforced double-faced corrugated board sheet, there are various methods which are readily available; however, these methods usually do not provide a corrugator for actually corrugating the reinforcing material during a simple sequential process. To overcome this fact, and in order to provide a continuous process for forming the double-faced reinforced board sheet O, the apparatus represented in FIG. 3 has been developed.

The arrangement of FIG. 3 shows the positioning of a mill roll stand 1 before a coater mechanism 2. The mill roll stand 1 is designed to hold both a first rolled material 11' for forming the first corrugated layer 11 and a second rolled material 12' for forming the second corrugated layer 12. Guide rolls 3, 3, 3, 3 and 3 surround the coater 2 for guiding the second rolled material 12' from the mill roll stand 1 underneath and to the front of the coater 2, then backward through the coater 2, and finally forward again above the coater 2 toward a preheater 41. The first rolled material 11' is led directly from the mill roll stand 1 to the preheater 41. After the second rolled material 12' passes through the coater 2, its centerline is aligned with the centerline of the first roller material 11' by means of the guide rolls 3, so that the two centerlines will coincide when the two rolled materials meet on the preheater 41.

The mill stand 1 which holds the rolled materials 11' and 12' has a crossarm 1a mounted on an upright support 1b. Both rolled materials are mounted on opposite ends of the crossarm 1a. The crossarm is maintained stationary to prevent any side to side movement of the two unwinding rolls of rolled material mounted thereon. Also, the unrolling of the second rolled material 12' may be controlled by hydraulic or air brakes to prevent the second rolled material from continuously unwinding due to the inertial forces built up during unwinding of that rolled material.

Through the coater 2 may be any suitable coater which will coat one side of the unrolled second rolled material 12', the specific embodiment shown in FIG. 3 shows an application roll 21, a doctor blade 22, a glue pan 23, a pressure roll 24 opposite the application roll 21, and a cover 25. Suitable adhesive 15 for adhering the first and second rolled materials is contained in the glue pan 23. The doctor blade 22 regulates the amount of adhesive 15 applied to the application roll 21 which is ultimately applied to the second rolled material. The doctor blade 22 is designed to move reciprocally back and forth across the application roll 21. The adhesive may be applied evenly to the roll or unevenly to vary the amount and location of the adhesive on the second rolled material 12'. As pointed out above, it might also be possible to use a spray coater for applying the adhesive to the material.

Next to the coater 2 is a single facer 4 which receives the adhesively joined first and second rolled materials and subsequently corrugates, adhesively coats one side of the corrugated material, and faces the adhesive-coated material with a layer of facing material 13. The single facer 4 of this invention follows the preheater 41 and a dancing roll 42. A moistener 43 for providing moist heat is first provided to receive the preheated first and second materials 11' and 12'. Corrugating rolls 44, 45 are provided for corrugating the adhesively bonded first and second materials. The rolls have therebeneath a second adhesive applying device which contains the adhesive 16 for attaching the corrugated materials to the bottom liner 13. An applying roll 46 in a glue trough 47 is adjacent the corrugating roll 45 and applies adhesive 16 to the flutes of the corrugated material as it passes around the roll 45. The corrugation rolls 44, 45 may be heated to further increase the drying and strength of the adhesive 15 or external heat may be applied at the time of pressing between the corrugating rolls.

Adjacent the roll 45 is an arrangement of rolls for advancing the bottom liner 13 toward the corrugated and adhesively coated first and second materials on the corrugating roll 45. A pair of rolls 48, 48 preheat the liner 13, and a pressure roll 49 adjacent the corrugating roll 45 forces the liner 13 against the corrugated material on roll 45.

During the corrugation of the first and second rolled materials 11', 12' by the rolls 44, 45, none of the adhesive 15 comes into contact with the rolls. This is because the adhesive 15 is coated onto the side of the second rolled material 12' which contacts the first rolled material 11'. It is also pointed out, as discussed earlier, that the second rolled material 12' which forms the second corrugated layer 12 of the sheet O is not as wide as the first rolled material 11'. There is never any adhesive 15 supplied directly against the side of the first rolled material 11' which contacts the roll 44. Thus, no burning of the adhesive on the roll or gumming of the rolls is possible. Further, if the doctor blade 22 is so adjusted, the adhesive 15 can be prevented from coating the edges of the second rolled material, and thereby prevent the adhesive from being squeezed from between the first and second materials when those materials pass between the corrugating rolls 44, 45.

When the bottom liner 13 is applied against the corrugated materials on the corrugating roll 45 excessive pressure is exerted by the pressure roll 49. At that time, the lining 13 must be affixed to both the second corrugated layer 12 as well as the first corrugated layer 11 extending on the sides of the second layer. The pressure of the applying roll 49 must, therefore, take into consideration the fact that the first corrugated layer 11 is only one layer thick in attempting to prevent pressure traces of the corrugating roll 45 from appearing on the bottom liner 13.

Following the single facer 4 is a take-up conveyor 5 which moves the corrugated first and second layers 11, 12 with the bottom liner 13 affixed thereto to a bridge 6. At this point a double facer (not shown) is provided to coat the remaining flutes on the uncoated side of the corrugated layers with a coating of adhesive 16 followed by a pressure application of the top liner 14 thereto. At that time, the double-faced board is completed. The board is then heated and cooled in the double facer and removed therefrom. This apparatus for applying the second face is well known in the art, and therefore, exhaustive discussion thereof is not presented.

Finally, the continuous double-faced corrugated reinforced material may be cut into desired length, and the individual sheet boards O are produced. These sheets may then be passed onto the appropriate box-making machine.

It is important to note, however, that as a result of first applying the bottom liner 13 with sufficient pressure, when the top liner 14 is affixed against the first corrugated layer 11, there are no diversions or differentials in the surface of the top liner 14. Thus, this top liner surface is very suitable for printing or marking thereon.

Accordingly, a double-faced corrugated reinforced sheet board O can be easily produced which has a smooth top liner 14 affixed to a first corrugated layer 11 thereunderneath. The first corrugated layer 11 is affixed to a second corrugated layer 12, however, the second layer is not of the same width as the first layer, so the width of this second reinforcement is not equal to the width of the top liner. Finally, affixed to the bottom side of the edges of the first layer 11 on either side of the second layer 12, and to the bottom of the second layer 12, is a bottom liner 13. The second layer 12 is forced into the bottom liner to such an extent that the bottom liner, too, is substantially smooth.

To form this board O, the two rolls of corrugating material 11' and 12' are supported on and withdrawn from the mill stand 1. The second roller corrugating material passes around guide rolls 3 in front of, back through and again in front of the coater 2 wherein one side of the second material 12' is coated with adhesive 15. After the second material 12' is adhesive-coated, the adhesive side is affixed to the first roller material 11' on the preheater 41, from which point it advances around the dancing roll 42 into the single facer 4. Inside the facer, the affixed first and second rolled materials are corrugated between corrugating roll 44 and 45 and coated with adhesive 16 by roll 46 on both the first and second corrugated layers 11, 12 on the bottom side thereof. Then, the bottom liner 13 is affixed to the adhesive-coated side of the corrugated layers by pressure applied from the pressure roll 49 against the bottom liner, the corrugated layers and the roll 45. The bottom-lined material then passes to a double-facer for the application of a top liner 14 against the top surface of the first corrugated layer 11.

It is also possible to carry out this procedure with this same apparatus and have a plurality of spaced second corrugated layers 12 affixed to the first corrugated layer 11. All that is necessary is to have several spaced rolls of second rolled material 12' side by side on the mill stand 1, and withdraw these rolls of material together through the apparatus. Once the corrugated board is lined on both faces, the board may be cut as desired.

It is further possible, as discussed herein, to modify this equipment to utilize plastic films rather than paper. Only brief discussion has been given this possibility, since the required modifications would be within the knowledge of one skilled in the art.

Finally, it is recognized that further modifications may be made to this invention which are within the scope of this invention, and therefore, this disclosure is not intended to describe all the limits of this invention.

What is claimed is:

1. A method for producing a reinforced, double-faced corrugated board having a reinforced area of lesser width than the width of the entire board, said method comprising:

coating a second corrugating layer on one side with an adhesive coating;

contacting the adhesive-coated side of said second corrugating layer with one side of a first corrugating layer of greater width than said second layer;

heating the resultant assembly;

subjecting the heated assembly to moist heat;

corrugating the moistened assembly between heated corrugating rollers and applying a second adhesive coating to one side of said first and second layers following the corrugating process, said adhesive being applied over said second corrugated layer and said first corrugated layer surrounding said second layer;

affixing a bottom facing liner of substantially the same width as said first corrugated layer against the adhesive-coated side of said first and second corrugated layers; and affixing, by means of an adhesive coating, a top facing liner of substantially the same size as said first corrugated layer to the second side of said first corrugated layer opposite the side to which said second corrugated layer is affixed, said top liner being affixed after said bottom liner is affixed.

2. A method as claimed in claim 1, wherein said contacting and said heating of the resultant assembly are conducted simultaneously on a heated roll means.

* * * * *